United States Patent
Kamo et al.

(10) Patent No.: US 6,868,973 B1
(45) Date of Patent: Mar. 22, 2005

(54) DRUM TYPE REFINING OR WASHING APPARATUS

(75) Inventors: Eiichi Kamo, Shizuoka-ken (JP); Nobuyuki Kamo, Shizuoka-ken (JP)

(73) Assignee: Sakae Kohki Co., Ltd., Shizouka (JP)

( * ) Notice: Subject to any disclaimer, the term of this patent is extended or adjusted under 35 U.S.C. 154(b) by 0 days.

(21) Appl. No.: 10/822,776

(22) Filed: Apr. 13, 2004

(30) Foreign Application Priority Data

Jan. 23, 2004 (JP) ........................................ 2004-016316

(51) Int. Cl.[7] .......................... B01D 33/11; D21C 9/06; B03B 5/00; B07B 1/24
(52) U.S. Cl. ....................... 210/403; 210/404; 210/406; 162/60; 162/380; 8/156; 209/270; 209/284; 209/288
(58) Field of Search ................................ 210/403, 404, 210/406; 209/270, 284, 288; 162/60, 380; 8/156

(56) References Cited

U.S. PATENT DOCUMENTS

| 3,275,150 A | * | 9/1966 | Tait ............................. 210/327 |
| 4,724,077 A | * | 2/1988 | Uchiyama ................... 210/394 |
| 5,685,983 A | * | 11/1997 | Frykhult ...................... 210/393 |
| 5,692,619 A | * | 12/1997 | Haeffner ...................... 209/271 |

FOREIGN PATENT DOCUMENTS

| JP | 08-176985 | * | 7/1996 |
| JP | 3231748 | | 9/2001 |

* cited by examiner

*Primary Examiner*—Thomas M. Lithgow
(74) *Attorney, Agent, or Firm*—Wenderoth, Lind & Ponack, L.L.P.

(57) ABSTRACT

The present invention provides a drum type refining or washing apparatus in which the refining or washing efficiency of a pulp suspension or a food suspension is remarkably enhanced by the filtration function of a rotary drum and by the filtrate sucking force of a filtrate receptive cell.

A drum type refining or washing apparatus in which a filtrate receptive chamber 34 facing the outer peripheral surface of a rotary drum 1 which is laterally installed, is defined by a plurality of filtrate receptive cells 31 arranged in the peripheral direction of the rotary drum 1, each filtrate receptive cell 31 being provided at one end thereof on the side opposite to the rotating direction of the rotary drum 1 with a discharge port 32 for discharging the filtrate received in the filtrate receptive chamber 34 of the filtrate receptive cell 31 through the rotary drum forming wall into the liquid vessel 11, the filtrate in the filtrate receptive chamber 34 of the filtrate receptive cell 31 being discharged in the liquid vessel 11 through the discharge port 32 during an escaping process of the filtrate receptive cell 31 onto the liquid surface 17 of the liquid vessel 11 in accordance with rotation of the rotary drum 1, discharge of the filtrate causing generation of a filtrate sucking force directing toward the inside of the filtrate receptive chamber 34 at the rotary drum forming wall which the filtrate receptive chamber 34 of the filtrate receptive cell 31 faces.

4 Claims, 7 Drawing Sheets

FIG.7C

DRUM TYPE REFINING OR WASHING APPARATUS

FIELD OF THE INVENTION

The present invention relates to a drum type refining or washing apparatus, and more particularly to a refining apparatus in which foreign matter can be removed from a suspension, for example, of pulp serving as paper making material and food, or a washing apparatus in which contaminant can be removed from the suspension.

BACKGROUND OF THE INVENTION

A pulp suspension serving as paper making material, particularly, a pulp suspension composed of waste paper pulp disintegrated by a pulper or the like contains foreign matter such as, for example, resin scrapes and tar grains caused by binding strings, metal foreign matter such as, for example, a metal binding device.

Heretofore, a cyclone apparatus, a vibration apparatus, a centrifugal separator or the like has been used as an apparatus for obtaining a refined paper material by removing foreign matter from the pulp suspension.

On the other hand, a patent material 1 owned by the present applicant provides a drum type washing apparatus, in which a pulp suspension is fed into a rotary drum which is laterally installed, and the pulp suspension thus fed is repeatedly raked up and dropped by a raking fin formed on an inner peripheral surface of the rotary drum, so that the ink component contained in the pulp suspension is filtrated and dehydrated through air and water passing apertures which are formed in the peripheral wall of the rotary drum.
[Patent Material 1] Official Gazette of Japanese Patent No. 3,231,748.

DISCLOSURE OF THE INVENTION
Problem to be Solved by the Invention

The present invention provides a drum type refining apparatus in which the rotary drum system shown in the above patent material 1 is employed instead of employing the principles of the various types of conventional apparatuses such as, a cyclone apparatus, a vibration apparatus, a centrifugal separator and the like, and a refined paper material or refined food (suspended substance) can be obtained by properly removing foreign matter contained in a pulp suspension or a food suspension by the rotary drum taught by the patent material 1. In other words, the invention provides a refining apparatus in which a suspended substance having a constant size is refined by having the suspended substance pass through air and water passing apertures formed in the rotary drum forming wall.

The present invention also provides a drum type washing apparatus in which a washed paper material or washed food (suspended substance) can be obtained by properly removing such as an ink component contained is a pulp suspension and a contaminant such as dust or the like contained in a food suspension. In other words, the invention also provides a washing apparatus in which dust or the like is washed by having it pass through air and water passing apertures formed in a rotary drum forming wall.
Means for Solving the Problem The present invention relates to a drum type refining or washing apparatus in which a lower circular part of a rotary drum having a drum forming wall of an air and water passing structure is infiltrated in a liquid vessel, a suspension is fed into the rotary drum, so that a suspended substance contained in the suspension is refined or washed by filtration function of the rotary drum forming wall at the lower circular part of the drum infiltrated in the liquid vessel.

As means for enhancing the refining performance and the washing performance of the drum type refining or washing apparatus, the rotary drum is provided at an outer peripheral surface thereof with a filtrate receptive cell, the filtrate receptive cell defining a filtrate receptive chamber facing the outer peripheral surface of the rotary drum.

A plurality of the filtrate receptive cells are arranged in a peripheral direction of the rotary drum, each of the filtrate receptive cell being provided at one end thereof on the side opposite to the rotating direction of the rotary drum with a discharge port for discharging the filtrate received in the filtrate receptive chamber of the filtrate receptive cell through the rotary drum forming wall into the liquid vessel.

The filtrate receptive cell repeats entry into and escape from the liquid of the liquid vessel in accordance with rotation of the rotary drum and the filtrate in the filtrate receptive chamber of the filtrate receptive cell is discharged in the liquid vessel through the discharge port during an escaping process of the filtrate receptive cell onto the liquid surface of the liquid vessel. Discharge of the filtrate causes generation of a filtrate sucking force directing toward the inside of the filtrate receptive chamber at the rotary drum forming wall which the filtrate receptive chamber of the filtrate receptive cell faces. The suspension is, for example, a pulp suspension.

At the time of infiltrating a lower circular part of the rotary drum in the liquid vessel and refining or washing the suspended substance by filtration function of the drum forming wall of the lower circular part as mentioned above, a filtrate sucking force is generated at the drum forming wall covered with the filtrate receptive cell, i.e., at the drum forming wall facing the filtrate receptive chamber of the filtrate receptive cell, thereby extensively enhancing the refining or washing efficiency by the drum forming wall.

A rear end face, in the opposite direction to the rotating direction of the rotary drum, of the filtrate receptive cell is opened to form the discharge port. In the alternative, the discharge port is formed by providing a discharge tube to a rear wall, in the opposite direction to the rotating direction of the rotary drum, of the filtrate receptive cell.
Effect of the Invention According to the present invention, by the filtration function of the rotary drum and by the filtrate sucking force of the filtrate receptive cell, the refining or washing efficiency of the pulp suspension and the food suspension is remarkably enhanced by the rotary drum.

Moreover, the air and water passing apertures formed in the rotary drum forming wall is normally cleaned by the filtrate sucking force, so that the function can wholesomely be maintained.

BRIEF DESCRIPTION OF THE DRAWINGS

FIG. 6 shows operation of the first example of the filtrate receptive cell shown in FIG. 1.

FIG. 7 shows operation of the second example of the filtrate receptive cell shown in FIG. 2.

BEST MODE FOR CARRYING OUT THE INVENTION

The best mode for carrying out the invention will be described hereinafter with reference to FIGS. 1 through 7.

Reference numeral 1 denotes a rotary drum of an air and water passing structure which has a countless number of air and water passing apertures formed in a drum forming wall. One each of belt carrying cylindrical parts 9 is coaxially connected to both ends of the rotary drum 1. A drum hanging driving belt 3 is wound around the outer peripheral surface of each belt carrying cylindrical part 9. An upper end of the drum hanging driving belt 3 is hung on a driving wheel 4 of the drum hanging driving belt 3 so that the drum 1 is rotatably laterally installed and aerially supported.

When the driving wheel 4 is driven for rotation by a motor 5, the rotary drum 1 is rotated in a lateral direction.

As means for making the rotary drum 1 in an air and water passing structure, a porous metal plate having an air and water passing apertures 2 composed of a large number of round apertures or grooves is bent to form the drum 1. In the alternative, a metal mesh is glued in a cylindrical form to thereby form the drum 1.

The rotary drum 1 of the air and water passing structure is provided at the center of an end plate 6 covering one end opening part thereof with a feed pipe 10 extending from the outside into the inside of the drum 1 and adapted to feed a suspension S such as a pulp suspension or a food suspension, or an exhaust water suspension generated at an exhaust water processing site. The suspension feed pipe 10 is provided at a distal end thereof with a suspension inlet port 7 which is open downward. The other end of the drum 1 is left open to serve as a discharge port 8 for a non-filtrated substance S2.

A lower circular part of the rotary drum 1 is infiltrated under a liquid surface of a liquid vessel 11 to define a lower infiltration zone Z1. The suspension S such as a pulp suspension is fed into the lower infiltration zone Z1 through the suspension inlet port 7, and a filtrated substance S1 is caused to pass into the liquid vessel 11 by filtration function of the drum lower circular part. Then, a non-filtrated substance S2 is discharged through the discharge port 8.

The rotary drum 1 is provided at an inner peripheral surface thereof with a feed fin 12 composed of a spiral fin or the like, such that the fin 12 is axially integrally rotated with the drum 1. While feeding the suspension S fed through the inlet port 7 from the inlet side end part toward the discharge port 8 by the feed fin 12 and while simultaneously agitating the suspension S, a filtration function is occurred by the drum forming wall.

In case the rotary drum 1 is used as a refining apparatus, a refined suspended substance is filtrated as the filtrated substance S1 into the liquid vessel 11 through the drum forming wall which is formed at the lower circular part of the rotary drum 1 and has a filtration function. Foreign matter contained in the suspension S is discharged as a non-filtrated substance S2 through the discharge port 8.

In case the rotary drum 1 is a refining apparatus, the feed fin 12 has a function for feeding the non-filtrated substance (foreign matter) S2 contained in the suspension S to the discharge port 8.

In case the rotary drum 1 is used as a washing apparatus, a contaminant contained in the suspension S is passed as the filtrated substance S1 into the liquid vessel 11 through the drum forming wall which is formed at the lower circular part of the rotary drum 1 and has a filtration function. A washed suspended substance contained in the suspension S is discharged, as the non-filtrated substance S2 through the discharge port 8.

In case the rotary drum 1 is a washing apparatus, the feed fin 12 has a function for feeding the non-filtrated substance (refined suspended substance) S2 to the discharge port 8.

The suspension S is, for example, the pulp suspension S. This pulp suspension S, particularly the pulp suspension S composed of a waste pulp disintegrated by a pulper and serving as a paper-making material contains foreign matter such as, for example, resin scrapes and tar grains caused by binding strings, metal foreign matter such as, for example, a metal binding device.

In the above rotary drum 1, a refined pulp (refined suspended substance) is filtrated as the filtrated substance S1 into the liquid vessel 11 through the drum forming wall which is formed at the lower circular part of the rotary drum 1 and has a filtration function. Foreign matter contained in the suspension S is discharged as a non-filtrated substance S2 through the discharge port 8. That is, the rotary drum 1 can be used as a refining apparatus for the pulp suspension S.

The suspension S is, for example, a food suspension S. As a representative example of the food suspension S, there can be listed a suspension S which is obtained by pulverizing a corn and dilating the pulverized corn with water. The refined corn powder (refined suspended substance) is passed, as the filtrated substance S1, into the liquid vessel 11, and the hunk (foreign matter) contained in the corn suspension S is discharged, as a filtrated substance S2, through the discharge port 8. That is, the rotary drum 1 can be used as a refining apparatus for the corn suspension S.

The above rotary drum 1 is also applicable as a refining apparatus usable at the site for processing an exhaust water, i.e., as a refining apparatus for removing foreign matter, as a non-filtrated substance S2, from an exhaust water (suspension) S.

Moreover, the above rotary drum 1 can also be used as a pulp washing apparatus, in which a contaminant such as an ink component contained chiefly in the waste pulp suspension S is removed, as the filtrated substance S1, into the liquid vessel 11 by means of filtration function of the drum forming wall at the drum lower circular part, and a refined pulp is discharged, as the non-filtrated substance S2, through the discharge port 8.

More specifically, the liquid vessel 11 is disposed at a lower part of the rotary drum 1, the liquid (water) 16 contained in the liquid vessel 11 is entered into the drum 1 through the air and water passing apertures 2 formed in the drum forming wall at the drum lower circular part to define a liquid surface 17 within the drum lower circular part. The level of the liquid surface 17 is preferably in the range from 30 degrees to 90 degrees in drum rotation angle. Anyway, the liquid surface 17 in the lower infiltration zone Z1 is set to a lower part of the suspension inlet port 7.

The suspension S fed through the suspension inlet port 7 is dropped into the liquid 16 within the drum 1. Then, while being fed by the feed fin 12 toward the discharge port 8 side, the refined substance such as a refined paper material is passed, as the filtrated substance S1, through the air and water passing apertures 2 formed in the drum lower circular part and discharged into the liquid 16 contained in the liquid vessel 11.

The non-filtrated substance S2 such as foreign matter which is not allowed to pass through the air and water passing apertures 2 in the lower infiltration zone Z1 is discharged outward of the drum 1 from a tail end of the lower infiltration zone Z1 by the feed fin 12 through the discharge port 8.

Figure 1:
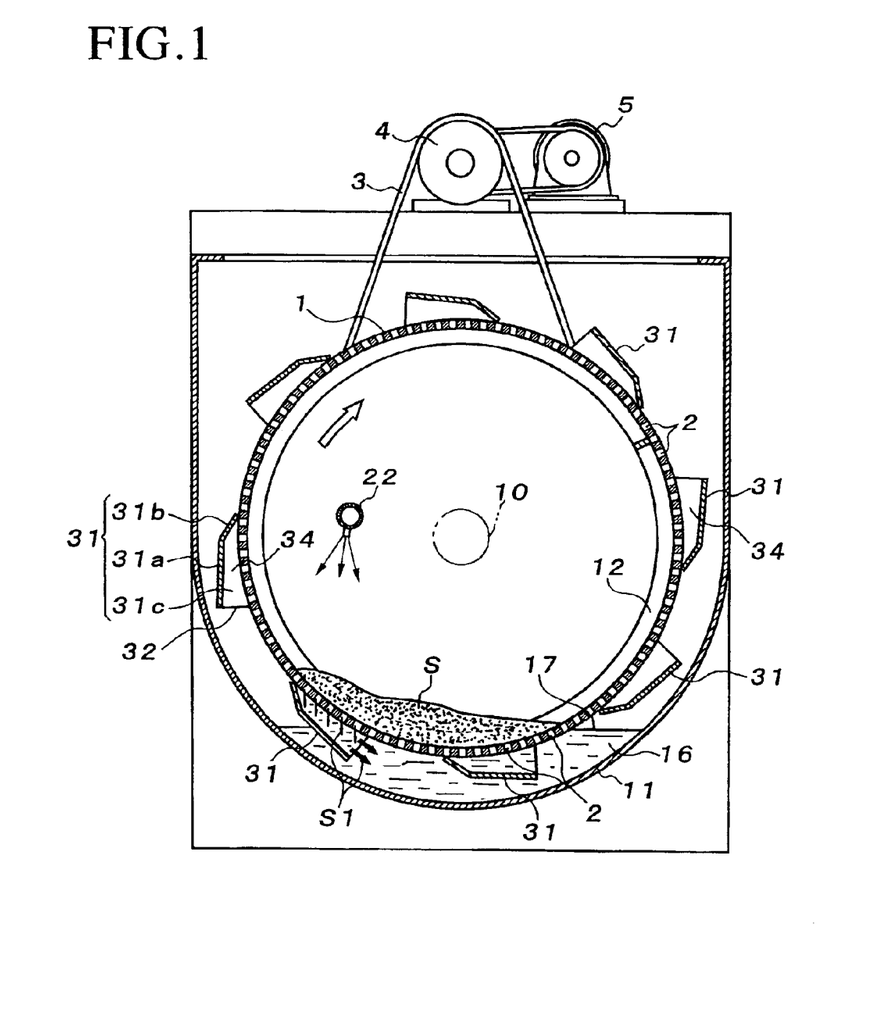
FIG. 1 is a cross-sectional view of a drum type refining or washing apparatus showing a first example of a filtrate receptive cell.
Figure 2:
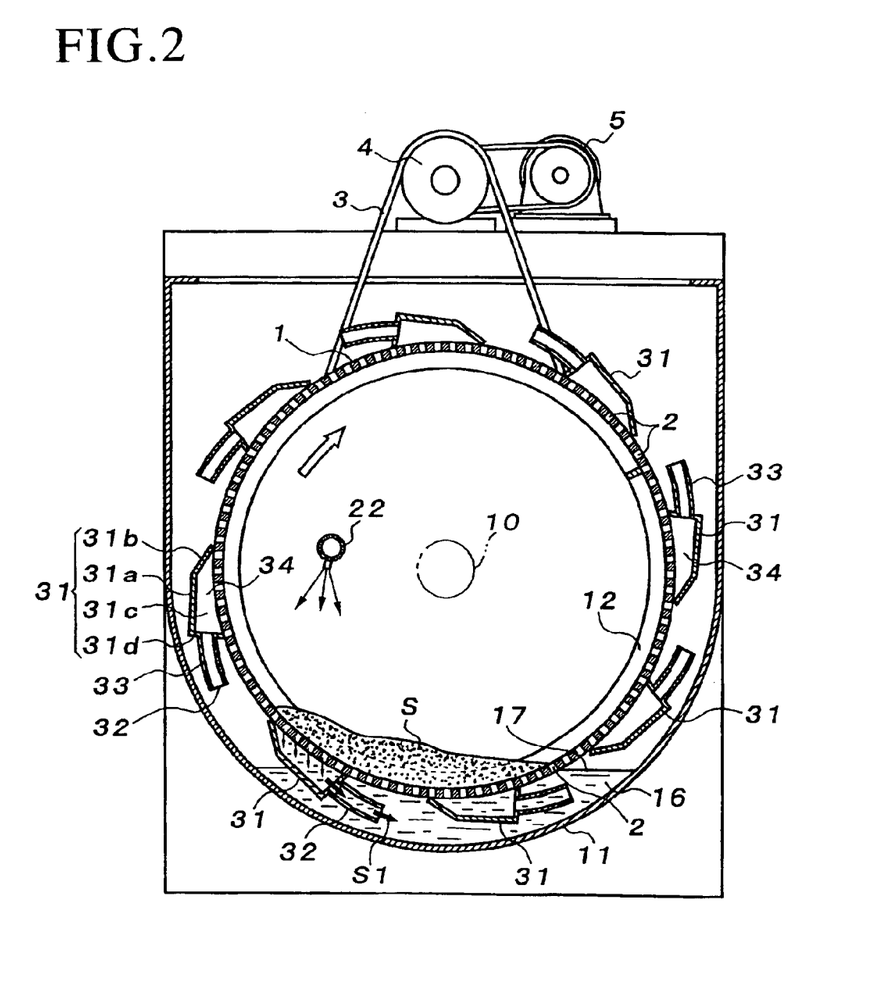
FIG. 2 is a cross-sectional view of a drum type refining or washing apparatus showing a second example of a filtrate receptive cell.
Figure 3:
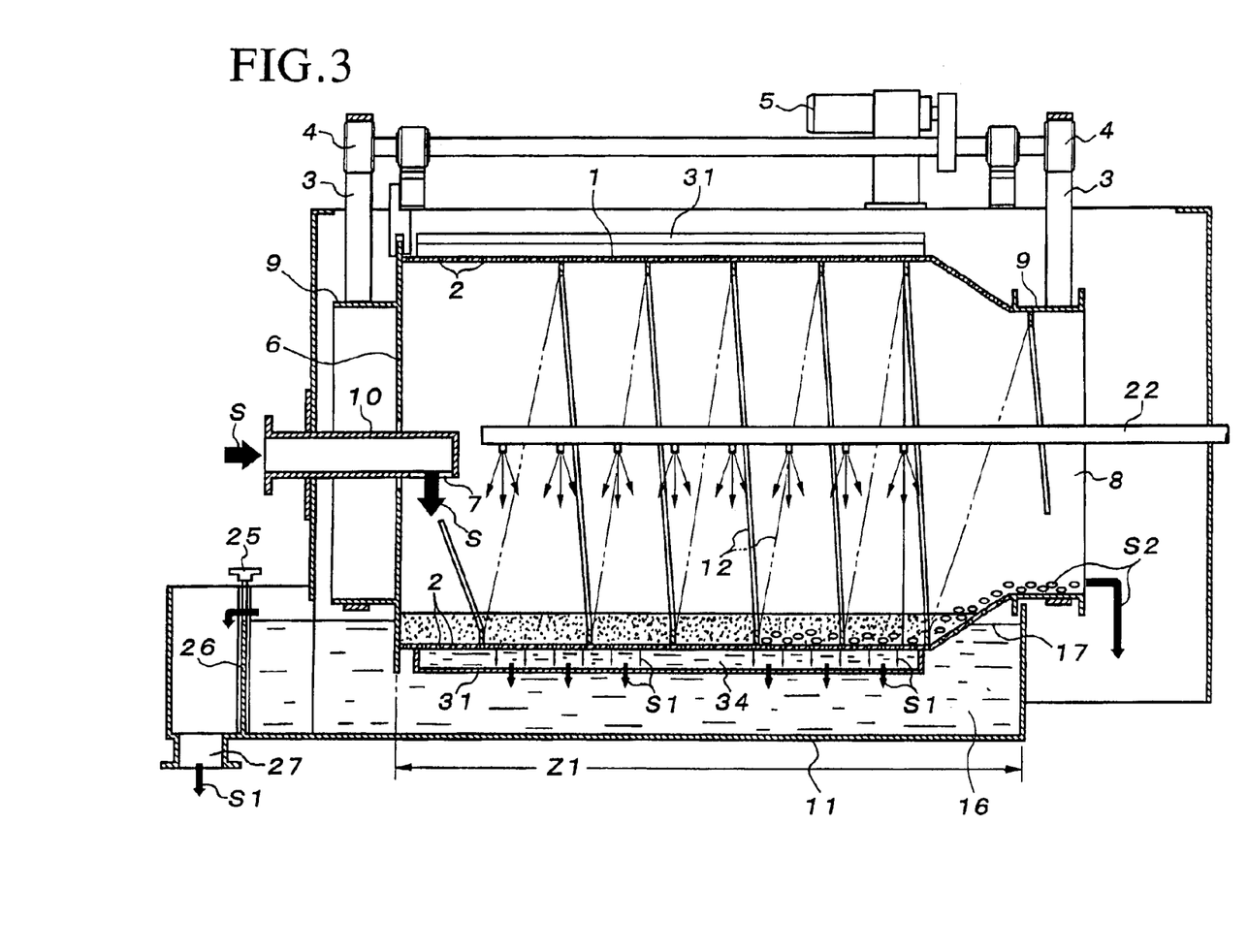
FIG. 3 is a vertical sectional view of a refining or washing apparatus which is formed of a perfectly circular cylindrical drum.
Figure 4:
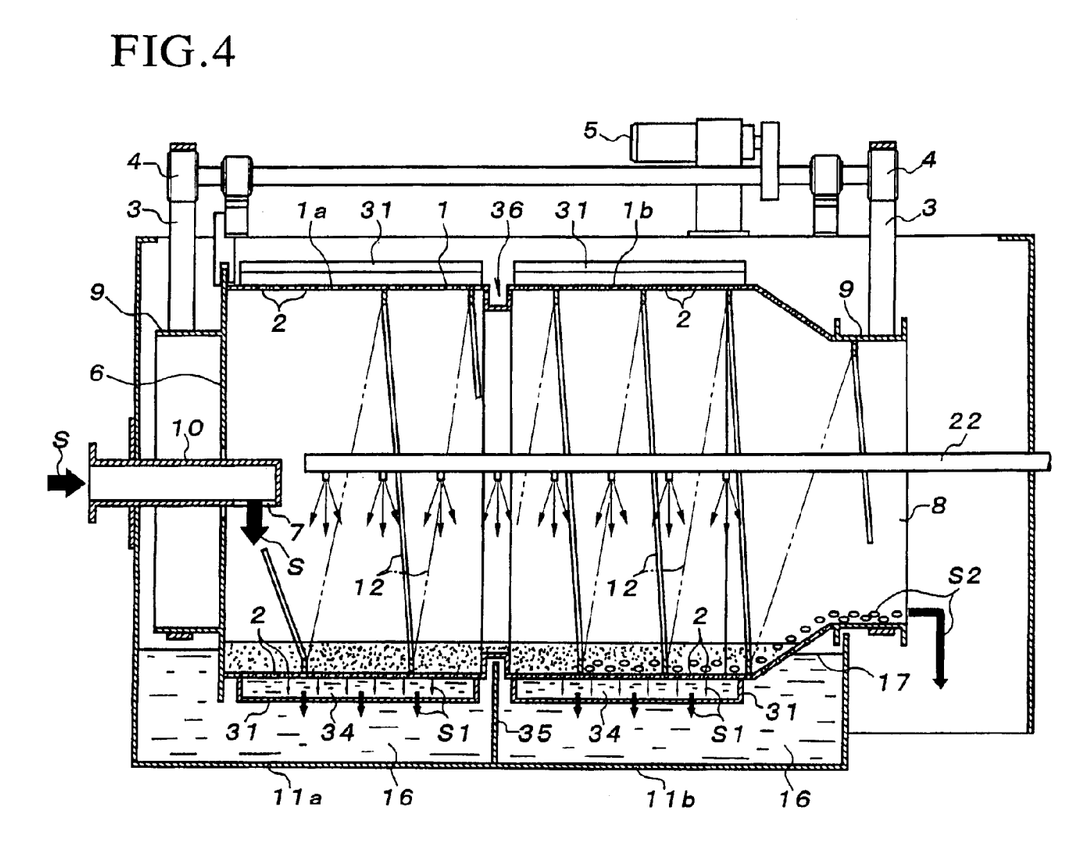
FIG. 4 is a vertical sectional view of a refining or washing apparatus which is formed of a two stepped cylindrical drum.
Figure 5:
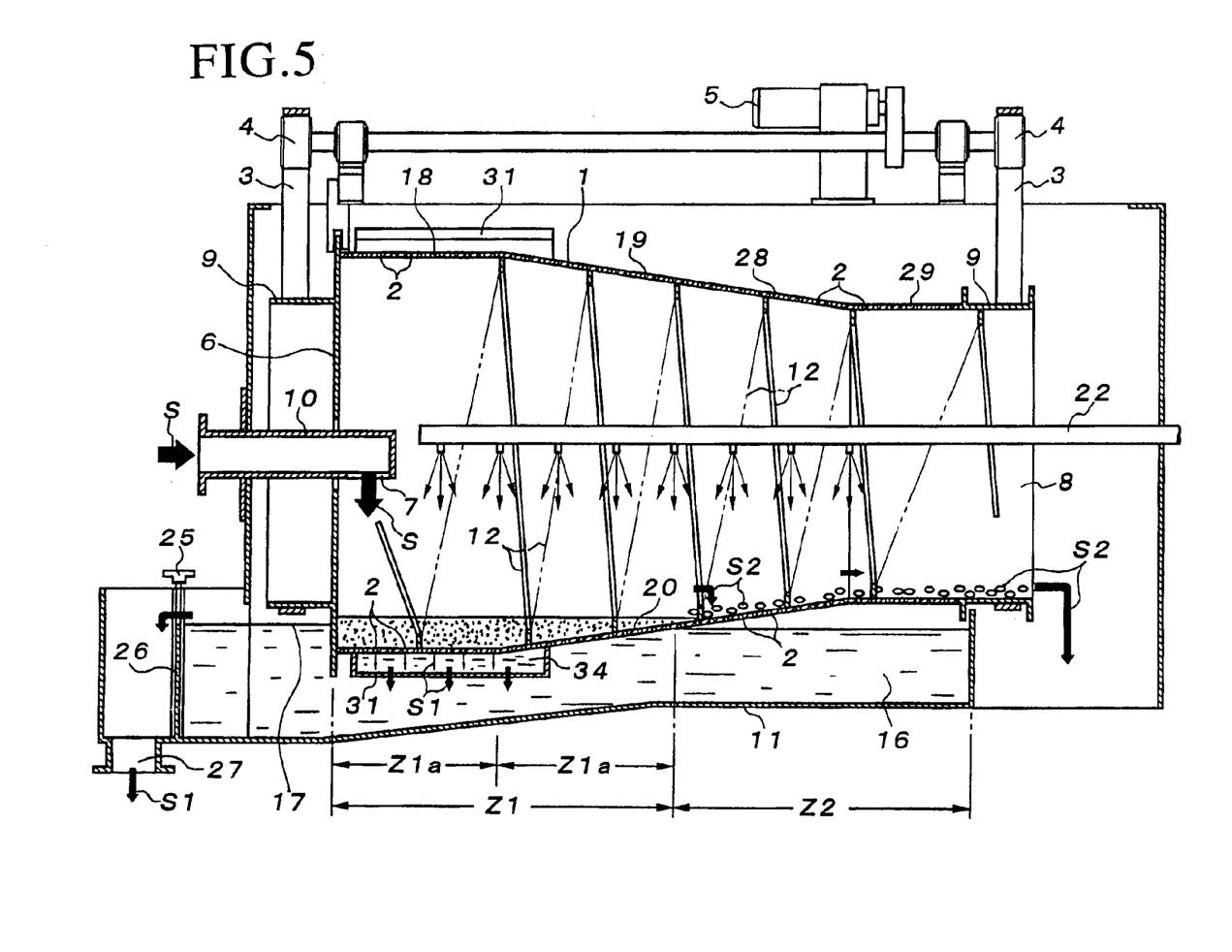
FIG. 5 is a vertical sectional view of a refining or washing apparatus which is formed of a perfectly circular cylindrical drum and an inclination cylindrical drum.

As means for enhancing the refining efficiency and washing efficiency by the rotary drum 1, as typically shown in FIGS. 3, 4 and 5, the rotary drum 1 is provided at an outer peripheral surface thereof with a filtrate receptive cell 31, and this filtrate receptive cell defines a filtrate receptive chamber 34 facing the outer peripheral surface of the rotary drum 1.

A plurality of the filtrate receptive cells 31 are arranged at equal pitches in the peripheral direction of the rotary drum 1, each of the filtrate receptive cell 31 is provided at one end thereof on the side opposite to the rotating direction of the rotary drum 1 with a discharge port 32 for discharging the filtrate (filtrated substance S1) received in the filtrate receptive chamber 34 of the filtrate receptive cell 31 through the rotary drum forming wall into the liquid vessel 11.

More specifically, in accordance with rotation of the rotary drum 1, the filtrate receptive cells 31 are sequentially infiltrated into the liquid 16 within the liquid vessel 11 and then sequentially escaped from the inside of the liquid 16. Thus, the filtrate receptive cells 31 are arranged at the peripheral wall of the drum 1 which defines the lower infiltration part Z1.

Each filtrate receptive cell 31 includes a top wall 31a, a front wall 31b continuous with a front end, in the rotating direction of the drum 1, of the top wall 31a, and left and right side walls 31c continuous with left and right side ends, in the axial direction of the drum 1, of the top wall 31a. The inner ends of the top wall 31a, the front wall 31b and the side walls 31c are tightly attached to the rotary drum forming wall by welding or the like, such that the top wall 31a, the front wall 31b and the side walls 31c, while locally covering the outer peripheral surface of the rotary drum forming wall, define the filtrate receptive chamber 34 facing the outer peripheral surface of the drum forming wall, i.e., the outer peripheral surface of the rotary drum 1.

As shown in FIG. 6, a rear end face, in the opposite direction to the rotating direction of the rotary drum 1, of the filtrate receptive cell 31 is opened to form the discharge port 32.

As shown in FIG. 7, the filtrate receptive cell 31 includes the top wall 31a, the front wall 31b, the side walls 31c and a rear wall 31d in the opposite direction to the rotating direction of the drum 1. The top wall 31a, the front wall 31b, the side walls 31c, and the rearwall 31d, while locally covering the rotary drum forming wall, define the filtrate receptive chamber 34 locally facing the rotary drum forming wall, and a discharge tube 33 projecting in the opposite direction to the rotating direction from the rear wall 31d is provided.

The discharge tube 33 is in communication at an end part thereof in the rotating direction of the drum 1 with the filtrate receptive chamber 34 and it forms the filtrate discharge port 32 at its end part in the opposite direction to the rotating direction of the drum 1.

Figure 6A:
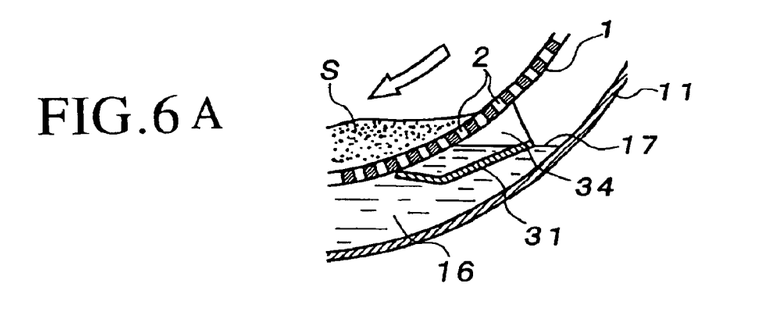
FIG. 6(A) is a cross-sectional view showing entry of the cell into the liquid surface of the liquid vessel.
Figure 7A:
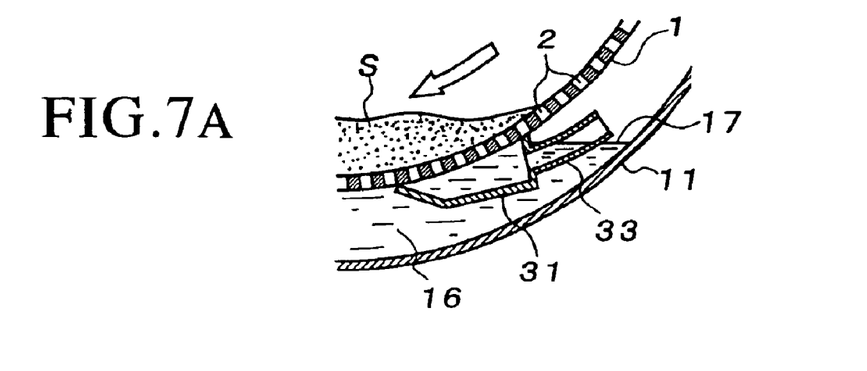
FIG. 7(A) is a cross-sectional view showing entry of the cell into the liquid surface of the liquid vessel.

As shown in FIGS. 6(A) and 7(A), although the rotary drum 1 is infiltrated into the liquid 16 through the liquid surface 17 of the liquid vessel 11 in accordance with rotation of the drum 1, the filtrate (filtrated substance S1) is received in the filtrate receptive chamber 34 through the drum forming wall until the discharge port 32 formed at the rear end of the filtrate receptive cell 31 is sunk into the liquid surface 17.

When the filtrate receptive cell 31 is fully sunk into the liquid 16 of the liquid vessel 11 with the progress of rotation of the rotary drum 1, a limited quantity of the liquid 16 is entered into the filtrate receptive chamber 34 through the discharge port 32 while maintaining some liquid 16 in the filtrate receptive chamber 34.

Figure 6B:
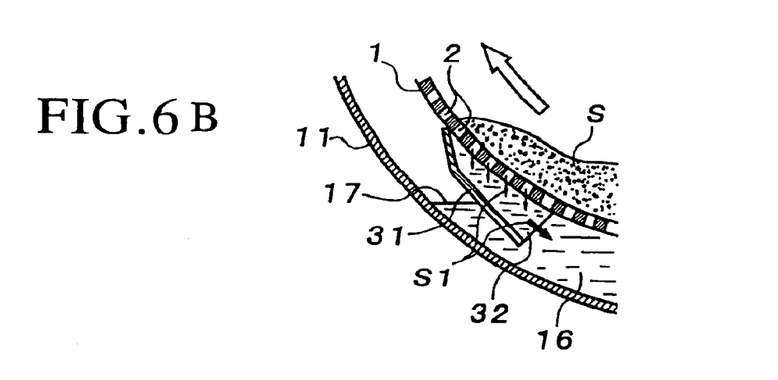
FIGS. 6(B) and 6(C) are cross-sectional views showing escape of the cell from the liquid surface.
Figure 7B:
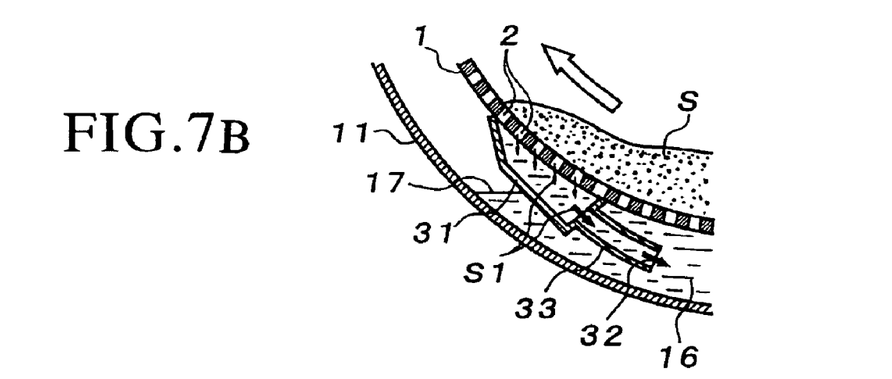
FIGS. 7(B) and 7(C) are cross-sectional views showing escape of the cell from the liquid surface.

As shown in FIGS. 6(B) and 7(B), in the process for the filtrate receptive cell 31 to escape onto the liquid surface 17 of the liquid vessel 11, the filtrate (filtrated substance S1) contained in the filtrate receptive cell 31 is discharged into the liquid vessel 11 through the discharge port 32. Discharge of the filtrate causes generation of a filtrate sucking force directing toward the inside of the filtrate receptive chamber at the region of the rotary drum forming wall covered with the filtrate receptive cell 31, i.e, at the rotary drum forming wall which the filtrate receptive chamber 34 of the filtrate receptive cell 31 faces.

Figure 6C:
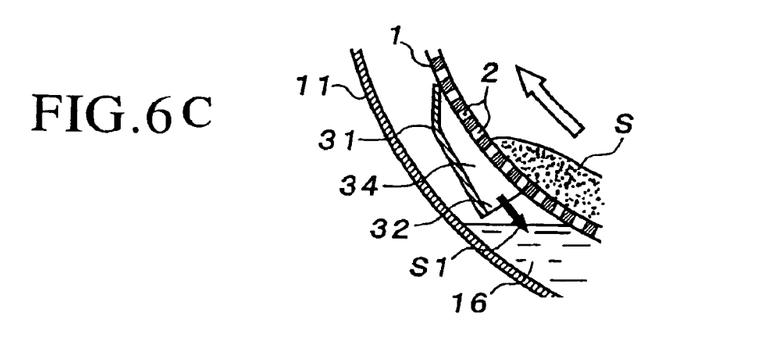
Figure 7C:
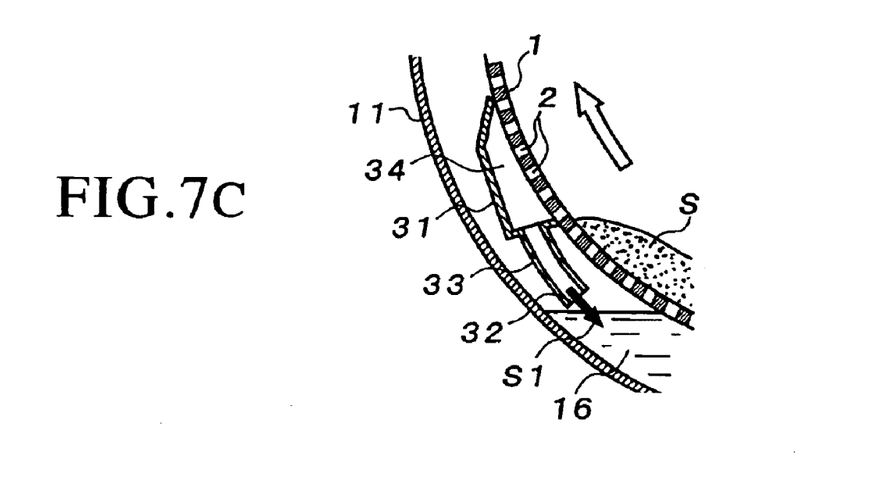

That is, the filtrate sucking force is generated until the front wall 31b of the filtrate receptive cell 31 is escaped from the liquid surface 17 and until the discharge port 32 is escaped onto the liquid surface 17. As shown in FIGS. 6(C) and 7(C), immediately after the discharge port 32 is escaped onto the liquid surface 17, the filtrate contained in the filtrate receptive chamber 34 is discharged at a time so that a large filtrate sucking force is instantaneously generated.

The discharge tube 33 serves to prolong the process for generating the filtrate sucking force and keep discharging the filtrate until the discharge tube 33 is escaped onto the liquid surface or even immediately after escaping of the discharge tube 33, so that the filtrate sucking force is generated.

For example, as shown in FIG. 3, the rotary drum 1 is formed in a perfectly circular cylindrical drum, the generally entire length of the rotary drum 1 is infiltrated in the liquid vessel 11 to define the infiltration zone Z1, the rotary drum 1 is provided with such various elements as the suspension inlet port 7, the non-filtrated substance discharge 8 and the feed fin 12, and the filtrate receptive cell 31 is disposed at the outer peripheral surface of the rotary drum 1.

Also, for example, the rotary drum 1 is formed of an inclination drum which is converged toward one end side, its enlarged-diameter side end part is provided with the suspension inlet port 7 and its reduced-diameter side end part is provided with the non-filtrated substance discharge port 8. Moreover, the feed fin 12 is disposed along the inclination inner peripheral surface of the inclination drum 1, the entire length of the inclination drum 1 or the entire length of the inclination drum 1 only excluding the reduced-diameter end (discharge port 8) is infiltrated into the liquid vessel 11 to define the lower infiltration zone Z1, and the filtrate receptive cell 31 is disposed at the outer peripheral surface of the inclination drum 1 which defines the lower infiltration zone Z1.

Also, for example, as shown in FIG. 4, the rotary drum 1 is formed of a perfectly circular cylinder, or of an inclination cylinder, or of a composite drum of a perfectly circular cylinder and an inclination cylinder, a front stage drum part 1a (drum part formed of a perfectly circular cylinder) is provided at its forming wall with an enlarged-diameter air and water passing aperture 2, the rear stage drum part 1b (drum part formed of a perfectly circular cylinder or an inclination cylinder) is provided at its forming wall with a reduced-diameter air and water passing aperture 2, the front stage drum part 1a is filtrated in the front stage liquid vessel 11a and the rear stage drum part 1b is infiltrated in the rear stage liquid vessel 11b.

The filtrate receptive cells 31 are arranged at equal pitches on the outer peripheral surface of the front stage drum part 1a, and the filtrate receptive cells 31 are arranged at equal pitches on the outer peripheral surface of the rear stage drum part 1b.

Owing to the above-mentioned arrangement, in the front stage drum part 1a, the filtrated substance S1 of small particle size is passed into the front stage liquid vessel 11a through the front stage filtrate receptive cell 31, and in the rear stage drum part 1b, the filtrated substance S1 of large particle size is passed into the rear stage liquid vessel 11b through the rear stage filtrate receptive cell 31.

A partition plate 35 for partitioning a section between the front and rear stage liquid vessels 11a, 11b is received in an annular groove 36 formed between the front and rear stage drum parts 1a, 1b with an upper end of the partition plate 35 projecting above the liquid surface 17, so that communication between the front and rear stage liquid vessels 11a, 11b is prevented by the partition plate 35.

FIG. 5 shows a refining apparatus in which the rotary drum 1 is formed of a combination of a perfectly circular cylinder and an inclination cylinder. The concrete construction of the refining apparatus will be described hereinafter in detail.

The lower infiltration zone Z1 is defined by a drum part on the suspension inlet port 7 side of the rotary drum 1 which is laterally installed. That is, one end side lower circular part of the rotary drum 1 is infiltrated into the liquid vessel 11 to define the lower infiltration zone Z1, and the non-infiltration zone Z2 is defined by the rotary drum part continuous with the lower infiltration zone Z1, i.e., by the other end side of the rotary drum 1.

The filtrate (filtrated substance S1 (refined substrate) contained in the suspension S such as pulp suspension S) is received in the filtrate receptive chamber 34 through the air and water passing apertures 2 formed in the rotary drum forming wall which defines the lower infiltration zone Z1. As previously mentioned, the filtrate receiving in the filtrate receptive chamber 34 is discharged into the liquid 16 contained in the liquid vessel 11 through the discharge port 32 during the process for the filtrate receptive cell 31 to escape from the liquid surface 17, and the non-filtrated substance S2 such as foreign matter which is not allowed to pass through the air and water passing apertures 2 in the lower infiltration zone Z1 is discharged to the non-infiltration zone Z2 and then discharged to the outside through the discharge port 8.

The lower infiltration zone Z1 is defined by the drum part 18 of a perfectly circular cylinder disposed on the inlet side of the suspension S and the inclination drum part 19 which is disposed on the discharge port 8 side in such a manner as to be continuous with the drum part 18. The filtrate receptive cell 31 is disposed on the outer peripheral surface of the drum part 18 of the perfectly circle, etc.

The filtrate receptive cells 31 are arranged on the drum parts 18, 19, respectively. That is, the plurality of filtrate receptive cells 31 arranged in the peripheral direction of the drum 1 are arranged in parallel over plural stages in the axial direction of the drum 1.

The inclination drum part 19 is gradually reduced in diameter towards the discharge port 8 side. The non-filtrated substance S2 such as foreign matter is guided by the lower rising inclination surface 20 of the inclination drum part 19 and discharged to the lower inner surface of the rotary drum part which defines the non-infiltration zone Z2.

The liquid surface 17 in the liquid vessel 11 which defines the lower infiltration zone Z1 reaches the tail end of the inclination drum part 19, i.e., the end of the lower rising inclination surface 20.

The lower infiltration zone Z1 of the rotary drum 1 includes an infiltration zone Z1a defined by the rotary drum part 18 which is formed of a perfectly circular cylinder, and an infiltration zone Z1a defined by the inclination drum part 19.

The rotary drum part defining the non-infiltration zone Z2 is provided on the tail end side of the lower infiltration zone Z1 with an inclination drum part 28 which is risingly inclined toward the discharge port 8, and at the reduced-diameter side end part on the discharge port 8 side of the inclination drum part 28 with a drum part 29 of a perfectly circular cylinder such that the drum part 29 is continuous with the inclination drum part 28.

In case the inclination drum part 19 is disposed at the lower infiltration zone Z1, the inclination drum part 29 is disposed in such a manner as to be continuous with the inclination drum part 28 in the non-infiltration zone Z2, and both the inclination drum parts 19, 28 are reduced in diameter at a same inclination angle.

That is, the inclination drum part 19 is formed on the enlarged-diameter end side of the drum part which is reduced in diameter toward the discharge port 8, and the inclination drum part 28 is formed on the reduced-diameter end side.

The spiral fin forming the feed fin 12 is installed over the entire area including the drum part 18 formed of a perfectly circular cylinder, the inclination drum part 19 and the drum part 29 formed of a perfectly circular cylinder. The non-filtrated substance S2 is fed from the drum part 18 to the drum part 19 by the feed fin 12 and then, from the drum part 19 to the drum part 29 so as to be discharged through the discharge port 8.

As another concrete example, a liquid vessel 11 defining the lower infiltration zone Z1 is installed in such a manner as to reach a lower part of the rotary drum part which defines the non-infiltration zone Z2. The liquid surface 17 of the liquid 16 contained in the liquid vessel 11 is arranged to be lower than the non-infiltration zone Z2.

A part of the filtrated substance S1 (refined substance) is fed to the non-infiltration zone Z2 together with the non-filtrated substance S2 such as foreign matter. This filtrated substance S1 is dropped into the liquid vessel 11 through the air and water passing apertures formed in the rotary drum part forming wall which defines the non-infiltration zone Z2 so as to be converged with the refined substance (filtrated substance S1) allowed to pass in the lower infiltration zone Z1.

In this way, the refined filtrated substance S1 can be obtained in the liquid vessel 1 under the effect of the filtrate receptive cell 31. The refined filtrated substance S1 thus obtained is discharged through the filtrated substance outlet port 27 while allowing the substance S1 to flow over a liquid surface adjustable gate 26 which can be adjusted in height by a handle 25. This refined filtrated substance S1 of good quality, for example, refined pulp, is supplied as a papermaking material.

The rotary drum forming wall is provided at its inner or outer side with a shower pipe 22 for flowing down a suspended substance from the rotary drum forming wall into the lower infiltration zone Z1. The suspended substance thus flowed down is passed into the liquid vessel 11 through the air and water passing apertures formed in the rotary drum forming wall.

The shower pipe 22 is laid in the axial direction of the rotary drum parts 18, 19 which define the lower infiltration zone Z1. A washing water is jetted against the drum forming wall which has just escaped from the liquid surface 17 by nozzles spacedly arranged in the longitudinal direction of the shower pipe 22, so that the suspension such as pulp stack to the inner surface of the drum forming wall is washed off.

That is, a suspension is stack to the inner peripheral surfaces of the rotary drum parts 18, 19 which have escaped from the liquid surface 17 in the lower infiltration zone Z1. This suspension is washed off and flowed down into the liquid vessel 11 by the shower pipe 22, thereby wholesomely maintaining the filtrating function of the drum forming wall in the lower infiltration zone Z1.

Likewise, the shower pipe 22 is laid along the axial direction of the rotary drum parts 28, 29 which defined the non-infiltration zone Z2. A washing water is jetted against the drum forming wall which has just escaped from the liquid surface 17 by nozzles spacedly arranged in the longitudinal direction of the shower pipe 22, so that the suspension stack to the inner surface of the drum forming wall is washed off.

That is, a suspension is stack to the inner peripheral surfaces of the rotary drum parts 28, 29 in the non-infiltration zone. This suspension is washed off and flowed down into the liquid vessel 11 by the shower pipe 22, thereby wholesomely maintaining the filtrating function of the drum forming wall in the non-infiltration zone Z2.

The shower pipes 22 are separately provided to the lower infiltration zone Z1 and the non-infiltration zone Z2 or only one shower pipe 22 is continuously provided over the entire area from the lower infiltration zone Z1 to the non-infiltration zone Z2. At least, the shower pipe 22 is laid along the lower infiltration zone Z1 such that its end part reaches the starting end pat of the non-infiltration zone Z2.

According to the present invention, owing to the filtration function of the rotary drum 1 and the filtrate sucking force of the filtrate receptive cell 31, the refining or washing efficiency of the rotary drum 1 with respect to the pulp suspension S and the food suspension S is remarkably enhanced.

Moreover, by normally cleaning the air and water passing apertures 2 formed in the rotary drum forming wall by means of the filtrate sucking force, the function of the air and water passing apertures 2 can be maintained in a wholesome manner.

What is claimed is:

1. A drum type refining or washing apparatus in which a lower circular part of a rotary drum having an air and water passing structure and laterally installed is infiltrated in a liquid vessel, a suspension is fed into said rotary drum, so that a suspended substance contained in said suspension is refined or washed by filtration function of a rotary drum forming wall of the air and water passing structure at said lower circular part of said drum infiltrated in said liquid vessel, wherein said rotary drum is provided at an outer peripheral surface thereof with a filtrate receptive cell, said filtrate receptive cell defining a filtrate receptive chamber facing the outer peripheral surface of said rotary drum, a plurality of said filtrate receptive cells being arranged in a peripheral direction of said rotary drum, each of said filtrate receptive cell being provided at one end thereof on the side opposite to the rotating direction of said rotary drum with a discharge port for discharging said filtrate received in said filtrate receptive chamber of said filtrate receptive cell through said rotary drum forming wall into said liquid vessel, said filtrate in said filtrate receptive chamber of said filtrate receptive cell being discharged in said liquid vessel through said discharge port during an escaping process of said filtrate receptive cell onto the liquid surface of said liquid vessel in accordance with rotation of said rotary drum, discharge of said filtrate causing generation of a filtrate sucking force directing toward the inside of said filtrate receptive chamber at said rotary drum forming wall which said filtrate receptive chamber of said filtrate receptive cell faces.

2. A drum type refining or washing apparatus according to claim 1, wherein a rear end face, in the opposite direction to the rotating direction of said rotary drum, of said filtrate receptive cell is opened to form said discharge port.

3. A drum type refining or washing apparatus according to claim 1, wherein said discharge port is formed by providing a discharge tube to a rear wall, in the opposite direction to the rotating direction of said rotary drum, of said filtrate receptive cell.

4. A drum type refining or washing apparatus according to claim 1, wherein said suspension is a pulp suspension.

* * * * *